(12) United States Patent  
Scrimshaw et al.

(10) Patent No.: US 7,942,211 B2
(45) Date of Patent: May 17, 2011

(54) POWER TOOL

(75) Inventors: David Leigh Scrimshaw, Beauniaris (AU); Benjamin Luke Van der Linde, Narre Wurren South (AU)

(73) Assignee: Demain Technology, Pty Ltd, Braeside, Victoria (AU)

( * ) Notice: Subject to any disclaimer, the term of this patent is extended or adjusted under 35 U.S.C. 154(b) by 262 days.

(21) Appl. No.: 12/064,507

(22) PCT Filed: Apr. 26, 2006

(86) PCT No.: PCT/AU2006/000542
§ 371 (c)(1),
(2), (4) Date: Jul. 16, 2008

(87) PCT Pub. No.: WO2007/025322
PCT Pub. Date: Mar. 8, 2007

(65) Prior Publication Data
US 2009/0200053 A1 Aug. 13, 2009

(30) Foreign Application Priority Data

Aug. 29, 2005 (AU) .............................. 2005904708

(51) Int. Cl.
*B23B 45/02* (2006.01)
(52) U.S. Cl. ........... 173/48; 173/176; 173/216; 173/217
(58) Field of Classification Search .............. 173/2, 176, 173/178, 217, 177, 48, 216
See application file for complete search history.

(56) References Cited

U.S. PATENT DOCUMENTS

| | | | |
|---|---|---|---|
| 4,389,146 A | 6/1983 | Coder | |
| 4,524,896 A | 6/1985 | Morrell, Jr. | |
| 4,834,192 A | 5/1989 | Hansson | |
| 4,858,230 A | 8/1989 | Duggan | |
| 4,892,013 A | 1/1990 | Satoh | |
| 5,195,760 A | 3/1993 | Wheeler et al. | |
| 5,277,527 A | 1/1994 | Yakota et al. | |
| 5,284,217 A * | 2/1994 | Eshghy | 173/176 |
| 5,657,417 A | 8/1997 | Di Troia | |
| 5,685,549 A | 11/1997 | Yang | |
| 6,045,303 A | 4/2000 | Chung | |
| 6,062,114 A | 5/2000 | Rahm | |
| 6,516,896 B1 * | 2/2003 | Bookshar et al. | 173/1 |

(Continued)

FOREIGN PATENT DOCUMENTS

DE 29813077 U1 10/1998

(Continued)

OTHER PUBLICATIONS

Office Action mailed Mar. 31, 2010 in U.S. Appl. No. 12/064,251.

(Continued)

*Primary Examiner* — Scott A. Smith
(74) *Attorney, Agent, or Firm* — Baker & Daniels LLP

(57) ABSTRACT

This invention relates to a power tool one having a driven member 5 for releasably gripping a working element 4. The power tool is operable in a working mode in which the working element performs work, or an adjustment mode in which the driven member 5 grips or releases the working element 4. The power tool includes a powered selector means including a controller 6 which enables the operator to select the mode of operation of the power tool.

24 Claims, 5 Drawing Sheets

U.S. PATENT DOCUMENTS

| | | | |
|---|---|---|---|
| 6,536,536 B1 * | 3/2003 | Gass et al. | 173/2 |
| 6,598,684 B2 | 7/2003 | Watanabe | |
| 6,687,567 B2 * | 2/2004 | Watanabe | 700/168 |
| 6,834,730 B2 | 12/2004 | Gass et al. | |
| 6,836,614 B2 * | 12/2004 | Gilmore | 388/811 |
| 6,892,827 B2 | 5/2005 | Toyama et al. | |
| 6,913,087 B1 * | 7/2005 | Brotto et al. | 173/1 |
| 6,945,337 B2 * | 9/2005 | Kawai et al. | 173/183 |
| 7,036,703 B2 * | 5/2006 | Grazioli et al. | 227/10 |
| 7,124,839 B2 | 10/2006 | Furuta et al. | |
| 7,410,006 B2 * | 8/2008 | Zhang et al. | 173/1 |
| 7,410,007 B2 | 8/2008 | Chung et al. | |
| 2003/0196824 A1 | 10/2003 | Gass et al. | |
| 2006/0186612 A1 | 8/2006 | Puzio | |
| 2009/0016834 A1 | 1/2009 | Scrimshaw et al. | |

FOREIGN PATENT DOCUMENTS

| | | |
|---|---|---|
| WO | WO02058893 A1 | 8/2002 |

OTHER PUBLICATIONS

Response (Amendment) filed Aug. 31, 2010 in U.S. Appl. No. 12/064,251.

Office Action mailed Nov. 9, 2010 in U.S. Appl. No. 12/064,251.

* cited by examiner

POWER TOOL

CROSS-REFERENCE TO RELATED APPLICATIONS

This is a U.S. National Phase Patent Application based on International Patent Application Serial No. PCT/AU2006/000542 filed on Apr. 26, 2006, the disclosure of which is expressly incorporated by reference herein.

This invention relates to power tools of the kind having a driven member which is adapted to releasably grip a working element. The power tool is operable in a working mode to drive the working element to perform work on a workpiece. The invention is applicable to all types of power tools, including power garden tools. However the invention has been developed having regard to hand held power drills and it would be convenient to hereinafter to describe the invention with particular reference to hand held power drills. It is to be understood that the invention has broader application.

Conventional hand held power drills have a driven member that grips a working element and is rotated to enable the element to perform work. The driven member includes chuck jaws to grip the working element. The chuck jaws are adjustable by causing relative rotation between an adjustment nut and a chuck body. The power tool includes a drive means having a motor and a gear assembly through for driving the driven member.

The applicant has previously designed a power drill having a locking sleeve, the power drill being operable in an adjustment mode so that the locking sleeve restrains the adjustment nut while the chuck body can be rotated by the drive means to adjust the chuck jaws. The drive means of the power tool has the capacity to produce too much torque, particularly when closing the chuck jaws. More recently the applicant has appreciated that the power tool and the manner by which the user operates the power tool could be enhanced.

The above discussion of documents, acts, materials, devices, articles and the like is included in this specification solely for the purpose of providing a context for the present invention. It is not suggested or represented that any of these matters formed part of the prior art base or were common general knowledge in the field relevant to the present invention as it existed in Australia before the priority date of this invention.

It is an object of the present invention to provide a power tool that is relatively simple to use. It is a further object of the invention to provide a power tool having means to assist the user to operate the tool in an adjustment mode to grip or release the working element. It is a further object of this invention to provide a tool that has means to control the level of torque produced.

According to one aspect of the present invention there is provided a power tool including:

a first driven member for gripping a working element, the power tool being operable in either a working mode in which the first driven member is driven to enable a gripped working element to perform work, or an adjustment mode in which the first driven member grips or releases the working element; and a powered selector means operable to cause the power tool to operate in one of said modes.

In a preferred embodiment the first driven member includes a body part and an adjustment part that when in adjustment mode are moved relative to one another, to grip or release the working element, and said parts move together when in the working mode. The power tool preferably includes a primary drive means which is connected to the body part to drive the first driven member. It is preferred that the primary drive means include a first motor and a gear assembly through which the first motor is connected to the first driven member. It is preferred that when in a working mode the gear assembly be adjustable between at least a relatively low gear and a relatively high gear and it is preferred that the adjustment of the gear assembly is caused by operation of the powered selector means. The gear assembly may have more than two gears.

The power tool preferably includes a locking means operable to engage the adjustment nut and thereby enable the body part to move relative to the adjustment part, and the selector means is operable to cause the locking means to engage with or disengage from the adjustment nut. Whilst the locking means could be moved by operation of the primary drive means, it is preferred that the powered selector means include a secondary drive means that is operable to move a second driven member whereby the locking means is connected to the second driven member to move therewith. The secondary drive means preferably includes a second motor driving a screw threaded output shaft, which is received by a threaded bore located in the second driven member. The provision of a secondary drive means that is distinct from the primary drive means requires both drive means to function to cause gripping of the working element. This can provide a safety advantage in that, for example where the power tool is a drill, a malfunction of both the primary and secondary drive means is required to cause uncontrolled gripping of the drill bit. It is preferred that primary and secondary drive means function is sequence to provide further safety advantages.

The powered selector means preferably includes a shifter that is connected to the gear assembly for movement between a relatively low gear position and a relatively high gear position. The powered selector means preferably includes biasing means for biasing the shifter towards a low gear position. The shifter is preferably moved towards the high gear position by operation of the secondary drive means moving the second driven member to engage the shifter and move the shifter to the high gear position. The biasing means may be electronic or mechanical.

The powered selector means preferably includes a microcontroller, preferably fitted to a printed circuit board (PCB). The microcontroller preferably receives user input from a controller. The controller preferably includes at least one switch, preferably in the form of a button switch to enable the user to select adjustment mode or working mode. It is further preferred that the button switch also enable selection of relatively low gear or relatively high gear when in working mode. The microcontroller is preferably connected to a sensor which assesses the position of the second driven member. At least a part of the sensor is preferably located on the second driven member and can identify whether the power tool is operating in adjustment mode, or relatively low or relatively high gear.

The microcontroller also preferably controls the level of current supplied to the primary drive means to control the level of torque supplied to the first driven member. The controller preferably includes a dial that receives user input on the level of torque selected by the user when in a working mode. It is preferred that the microcontroller controls the level of torque supplied to the first driven member when the power tool is in an adjustment mode so as to avoid damaging the working element. It is further preferred that the microcontroller allow greater torque to be supplied to the first driven member when releasing the working element than when gripping the working element. The power tool also preferably includes a direction switch for controlling the direction of current supplied to the primary drive means to control a direction of output from the primary drive. Controlling the direction of output may for example control whether the working element is rotated in a forward direction or in reverse.

The power tool preferably includes a primary drive switch for controlling the supply of power to the primary drive. The switch is preferably operable by a trigger button that can be depressed by a user to supply power to the primary drive when operating in either the adjustment mode or working mode. It is further preferred that the switch provide the only control of power to the primary drive.

The power tool is preferably a hand held power tool having its own power source in the form of a rechargeable battery. The battery is preferably detachable for recharging. The preferred form of power tool is a power drill.

According to another aspect of this invention there is provided a power tool for use with a working element, the power tool including:

a power source;

a first driven member for gripping the working element;

a primary drive means including a first motor and a gear assembly through which the motor is connected to the first driven member, the gear assembly being adjustable to operate in a relatively high or relatively low gear;

a shifter connected to the gear assembly and being operable to adjust the gear assembly between the relatively high or relatively low gear, the shifter having a second motor connected by an output shaft to a second driven member wherein the second driven member is connected to the gear assembly;

a microcontroller connected to the second motor for controlling power supplied from a power source to the second motor; and a controller for providing user inputs to the microcontroller, including a relatively high gear switch and a relatively low gear switch through which the user selects the gear assembly to operate in the relatively high or relatively low gear via operation of the shifter.

The power tool preferably includes a first driven member for gripping a working element, the power tool being operable in either a working mode in which the first driven member is driven to enable a gripped working element to perform work, or an adjustment mode in which the first driven member grips or releases the working element, and a powered selector means operable to cause the power tool to operate in one of said modes.

The controller preferably includes a dial that controls the level of current supplied to the primary drive means to control the torque produced by the primary drive means when in a working mode. It is preferred that the microcontroller controls the level of torque supplied to the first driven member when the power tool is in an adjustment mode so as to avoid damaging the working element. It is further preferred that the microcontroller allows greater torque to be supplied to the first driven member when releasing the working element than when gripping the working element. The power tool also preferably includes a direction switch for controlling the direction of current supplied to the primary drive means to control a direction of output from the primary drive. Controlling the direction of output may for example control whether the working element is rotated in a forward direction or in reverse.

According to another aspect of this invention there is provided a power tool for use with a working element including:

a primary drive means;

a first driven member driven by the primary drive means;

a microcontroller controlling the level of current supplied to the primary drive means to control the level of torque supplied to the first driven member;

the power tool being operable in either a working mode in which the first driven member is driven to enable a gripped working element to perform work, or an adjustment mode in which the first driven member grips or releases the working element; and a powered selector means operable to switch the power tool to operate in either working or adjustment mode.

The controller preferably includes a dial that receives user input on the level of torque selected by the user when in a working mode. It is preferred that the microcontroller controls the level of torque supplied to the first driven member when the power tool is in an adjustment mode so as to avoid damaging the working element. It is further preferred that the microcontroller allows greater torque to be supplied to the first driven member when releasing the working element than when gripping the working element.

According to another aspect of the invention there is provided a microprocessor for use with a power tool described here above. The microprocessor includes a processing unit and associated memory device for storing control logic to cause the microprocessor to receive a first user input from a controller representative of user selection of adjustment mode or working mode; and control the powered selector means to cause the power tool to operate in the selected mode.

The control logic may further act to cause the microprocessor to receive a second user input from the controller representative of user selection of relatively low or relatively high gear when in working mode; and control the powered selector means to cause the power tool to operate in the selected gear.

The control logic may further act to cause the microprocessor to receive a sensor input from a sensor which assesses the position of the second driven member; and identify whether the power tool is operating in adjustment mode, or relatively low or relatively high gear.

The control logic may further acts to cause the microprocessor to receive a third user input from the controller representative of user selection of a desired level of torque; and control the level of current supplied to the primary drive means to set the torque supplied to the first driven member to the selected level.

According to another aspect of the invention there is provided a microprocessor for use with a power tool for use with a working element. The power tool may include a power source; a first driven member for gripping the working element; a primary drive means including a first motor and a gear assembly through which the motor is connected to the first driven member, the gear assembly being adjustable to operate in relatively high or relatively low gear; a shifter connected to the gear assembly and being operable to adjust the gear assembly between the relatively high or relatively low gear, the shifter having a second motor connected by an output shaft to a second driven member wherein the second driven member is connected to the gear assembly; and a controller including user input devices, the user input devices including a relatively high gear switch and a relatively low gear switch through which the user selects the gear assembly to operate in the relatively high or relatively low gear via operation of the shifter. The microprocessor includes a processing unit and associated memory device for storing control logic to cause the microprocessor to receive user inputs from the user input devices; and control power supplied from a power source to the second motor according to the received user inputs.

According to another aspect of the invention there is provided a microprocessor for use with a power tool for use with a working element. The power tool includes a primary drive means; a first driven member for driven by the primary drive means, the power tool being operable in either a working mode in which the first driven member is driven to enable a gripped working element to perform work or an adjustment mode in which the first driven member grips or releases the working element; and a powered selector means operable to switch the power tool to operate in either working or adjustment mode. The microprocessor includes a processing unit and associated memory device for storing control logic to cause the microprocessor to receive a first user input from a controller representative of user selection of adjustment mode or working mode; and control the powered selector means to cause the power tool to operate in the selected mode.

It will be convenient to hereinafter describe the invention in greater detail by reference to the accompany drawings which show one example embodiment of the invention. The particularity of the drawings and the related detailed description is not to be understood as superseding the generality of the preceding broad description of the invention.

Figure 1:
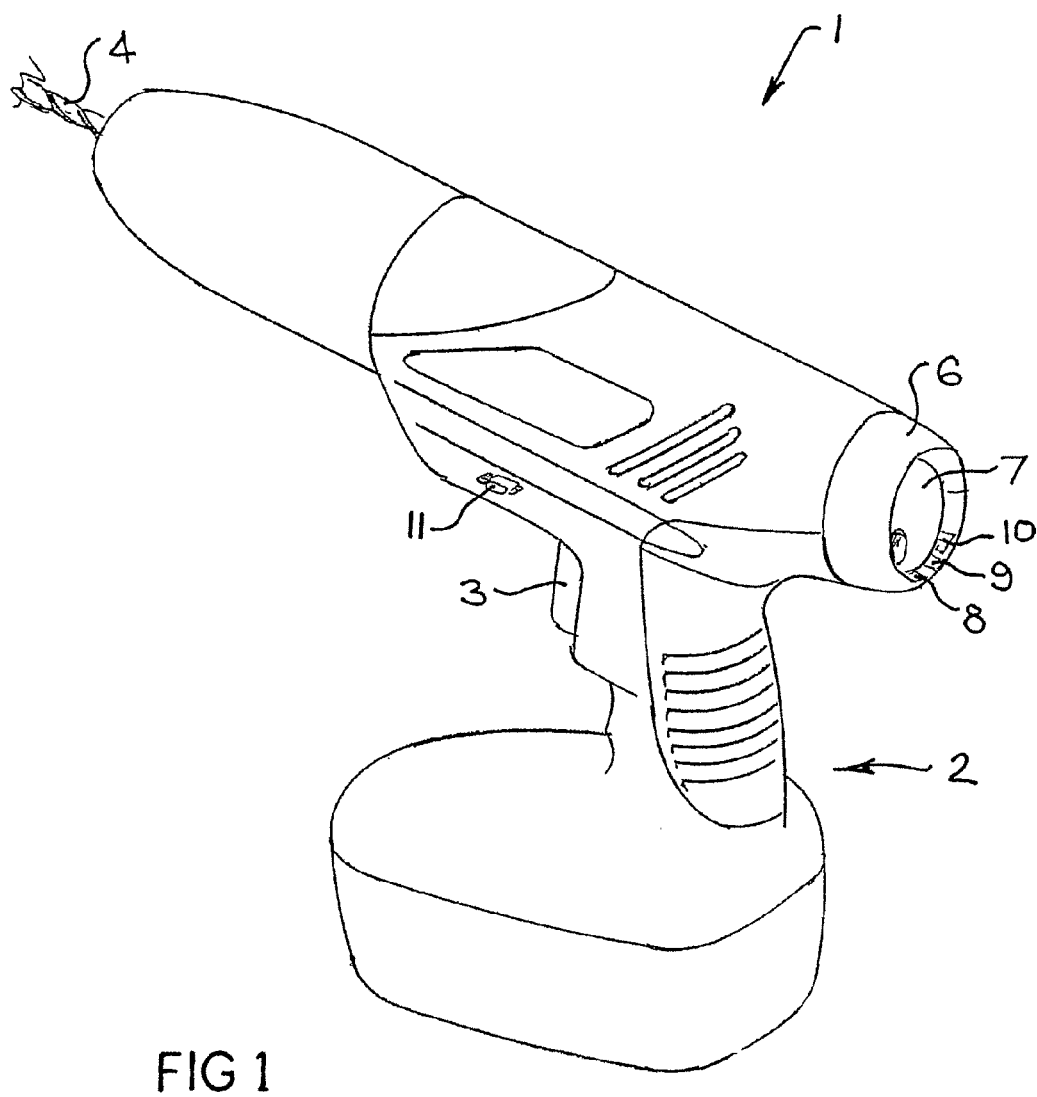
FIG. 1 illustrates in diagrammatic form a power drill according to a preferred embodiment of the invention.

FIG. 1 is an illustration of a power drill 1 being a preferred embodiment of the invention. The power drill 1 illustrated includes a handle 2 portion having a trigger 3 located adjacent the handle 2 portion. FIG. 1 illustrates a working element 4 in the form of a drill bit located at the front end of the power tool 1. The drill bit 4 is gripped by a first driven member 5 (not shown) which will be discussed with reference to later illustrations.

A controller 6 is shown positioned at the rear of the power tool 1. The controller receives inputs from the user for the operation of the power tool 1. The controller 6 illustrated includes a dial 7 and three switch buttons 8,9,10. The buttons 8,9,10 are preferably backlit when activated. In this preferred embodiment the buttons 8,9,10 represent chuck adjust, relatively high gear and relatively low gear respectively. These functions will be described with reference to later illustrations. The dial 7 allows the user to control the torque produced by the power tool. The dial 7 has a number of increments and is rotatable through a preferred range of rotation. The dial 7 may be rotatable through 300° and have 50 increments, however this is not essential. Other forms of controller are clearly possible.

The power tool 1 also includes a direction switch 11 which is illustrated in a position near the trigger 3. The switch 11 enables the user to select forward or reverse for the direction of rotation of the first driven member. Its position near the trigger 3 enables the user to easily change direction without having to release the handle 2. The switch 11 could be located in another position or even form part of the controller 6.

Figure 2:
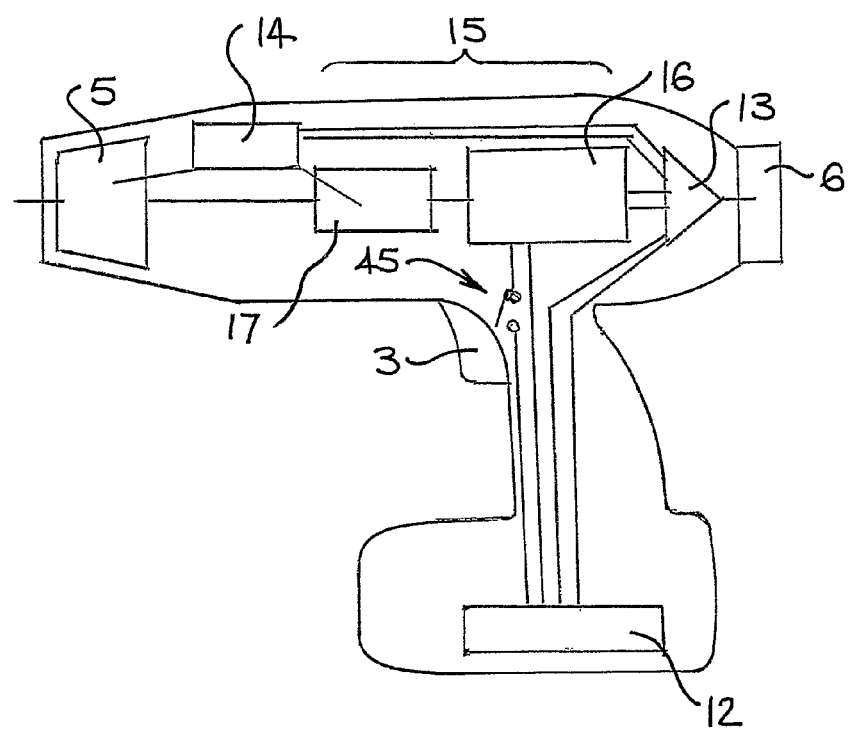
FIG. 2 illustrates in schematic form the power drill from FIG. 1.

FIG. 2 is a schematic illustration of a possible configuration of components of the power tool 1. FIG. 2 illustrates the power tool 1 having a power source 12 in the form of a battery located at the base of the handle 2 of the tool. The battery 12 is preferably a rechargeable battery. This battery could be detachable for recharging at a location remote from the remainder of the power tool.

In summary, power is supplied to a microcontroller 13, preferably incorporated with a printed circuit board (PCB), shown in the illustration located towards the rear of the power tool 1. Naturally this position is not essential. The microcontroller 13 receives user inputs from the controller 6, the direction switch 11 and/or the trigger 3. The microcontroller 13 controls power supplied to a power driven selector means 14 however power to a primary drive means 15 is controlled by a primary drive switch 45 which is operated by the trigger 3. The primary drive means 15 includes a first motor 16 and a gear assembly 17 which is connected to the first driven member 5. The power driven selector means 14 is connected to the first driven member 5 and the gear assembly 17. The functionality of these components will be described with reference to later illustrations.

Figure 3:
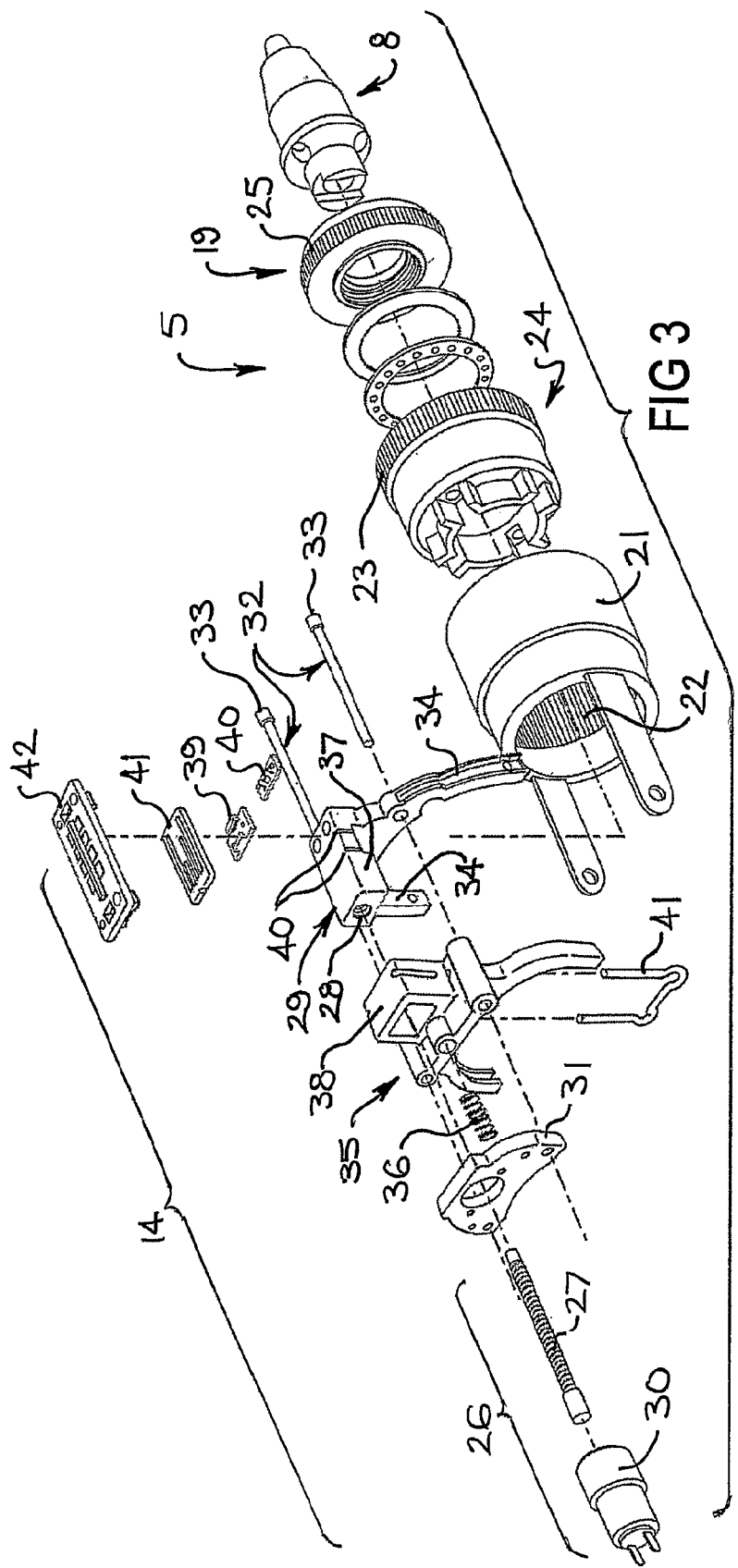
FIG. 3 illustrates a power driven selector means and driven member in exploded form according to a preferred embodiment of the invention.

FIG. 3 illustrates an exploded view of the power driven selector means 14 and first driven member 5. The components of the first driven member 5 illustrated include a chuck body 18 and an adjustment nut 19. The first driven member 5 also includes chuck jaws 20 (shown in FIGS. 4 to 6) which are adjustable by rotation of the nut 19 relative to the body 18. This adjustment is fully described in PCT/AU02/00075, the entire contents of which is incorporated herein by reference. In summary the primary drive means 15 (not shown) drives the chuck body 18 to rotate about an axis x. A locking means 21 which in the embodiment illustrated is in the form of a locking sleeve, has an internal spline 22 which engages in an external spline 23 of a fixed body 24. The locking sleeve 21 is movable in the axial direction x to a position where the internal spline 22 also engages an external spline 25 on the adjustment nut 19. Driving the chuck body 18 while the adjustment nut 19 is restrained causes adjustment of the chuck jaws 20. The direction of rotation of the chuck body 18 determines whether the jaws 20 will open or close to release or grip the working element 4. Movement of the locking sleeve 21 is controlled by operation of the power driven selector means 14 that is hereinafter described.

The power driven selector means 14 illustrated in FIG. 3 includes a secondary drive means 26 including a second motor 30. The secondary drive means 26 illustrated has an output shaft 27 in the form of a screw which is received in a threaded bore 28 of a second driven member 29. The second motor 30 abuts a flange that is fixed in position relative to the gear assembly body. Rotation of the output shaft 27 will move the second driven member 29 towards or away from the flange 31 depending on the direction of rotation of the output shaft 27. Other forms of secondary drive means are clearly possible as, for example, the second driven member 29 may be moved by operation of the primary drive means 15.

A pair of slide rods 32 extend from the flange 31 providing a guide along which the second driven member 29 travels. Each rod 32 has a head 33 located at its distal end to limit the amount of travel away from the flange 31.

The second driven member 29 is connected to the locking sleeve 21 by a pair of yoke arms 34. Other forms of connection are clearly possible.

The power driven selector means 14 illustrated in FIG. 3 also includes a shifter 35 for shifting between relatively low gear and relatively high gear. A preferred form of gear assembly is illustrated in greater detail in FIGS. 4 to 6 and as such will be described with reference to those illustrations. The shifter 35 is movable along the slide rods 32 away from the flange 31 under the influence of a compression spring 36, and towards the flange 31 by movement of the second driven member 29 towards the flange 31.

The second driven member 29 includes a body portion 37 that is located in a sleeve 38 of the shifter 35. The body portion 37 of the second driven member 29 includes a pair of grooves 40 formed on an outer surface thereof to receive a detent spring 41 associated with the sleeve 38 of the shifter 35. The detent spring 41 and grooves 40 ensure positive positioning of the sleeve 38 relative to the body 37 when shifting between relatively low or relatively high gear.

The position of the second driven member 29 is monitored to determine whether the power tool 1 is operating in an adjustment mode, or one of the working modes in relatively high or relatively low gear. In the embodiment illustrated a sensor plate 39 is connected to the second driven member 29 by a holder 40. An inductor plate 41 is connected to a top plate 42 where the top plate 42 is fixed in position relative to the gear assembly body 24. The position of the sensor 39 relative to the inductor is monitored by the microcontroller 13 to determine the position of the second driven member 29.

Figure 4:
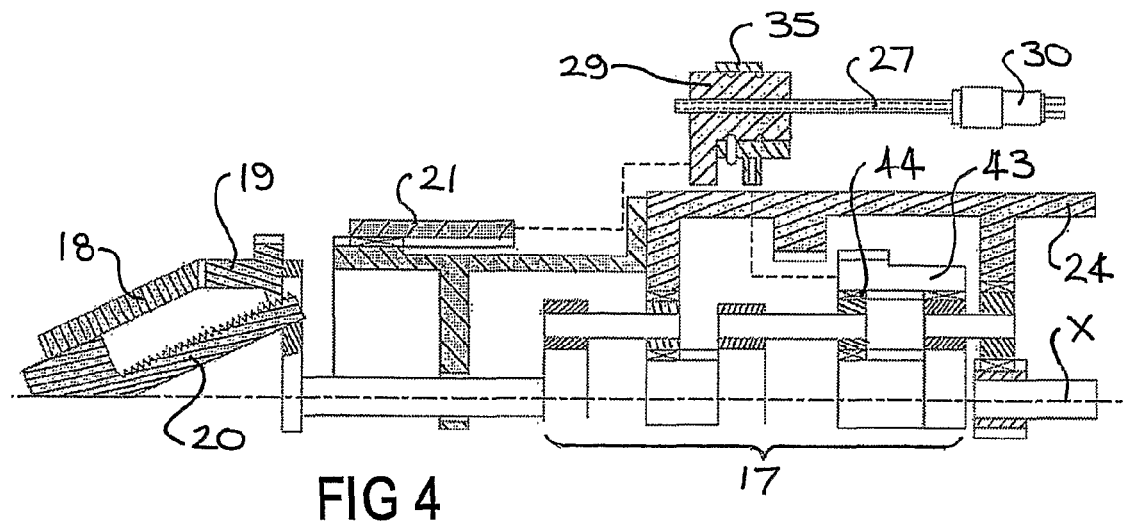
FIG. 4 is a cross section of the power driven selector means, first driven member, and gear assembly in high gear.
Figure 5:
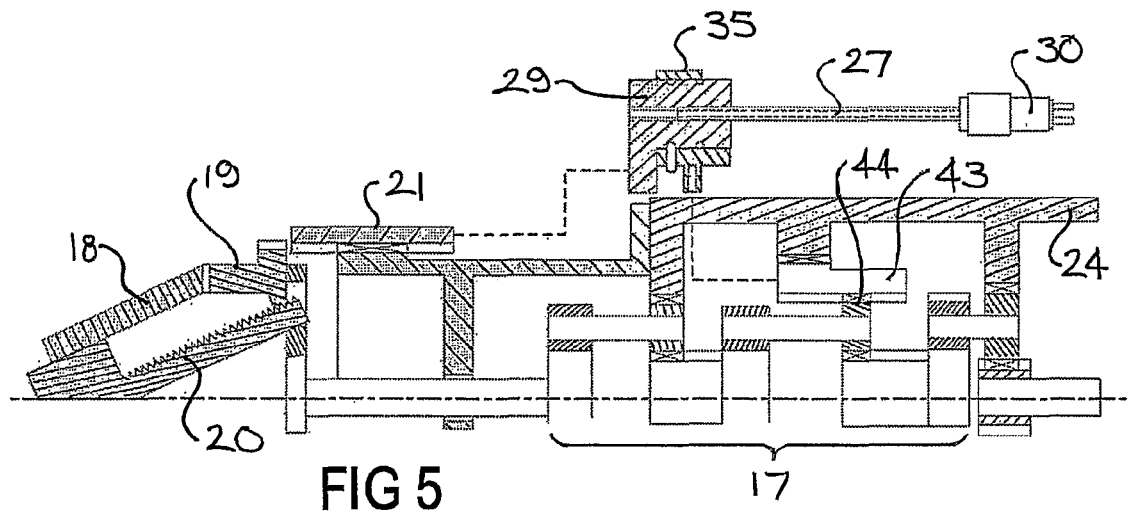
FIG. 5 is a cross section of the power driven selector means, first driven member, and gear assembly in low gear.

FIG. 4 illustrates in cross section a typical gear assembly 17 in high gear. The specific configuration of the gear assembly is not important to the invention in that any gear assembly operable in at least relatively high and relatively low gear would be suitable. While a two speed gear assembly is shown, the invention is also applicable to a single speed and more than two speed gear assembly. The configuration of the assembly illustrated is described in PCT/AU02/00075. For the purpose of this invention it is important to note that the shifter 35 is connected to a component of the gear assembly 17, which in the assembly illustrated is a ring gear 43. This component connected to the shifter 35 may be different for other gear assemblies. In high gear the ring gear 43 is detached from the gear assembly body 24 and free to rotate with the planet gears 44 about the axis of rotation x. In low gear as shown in FIG. 5 the ring gear 43 engages the gear assembly body 24 to restrain it from rotation while allowing the planet gears 44 to rotate relative to the ring gear 43.

Figure 6:
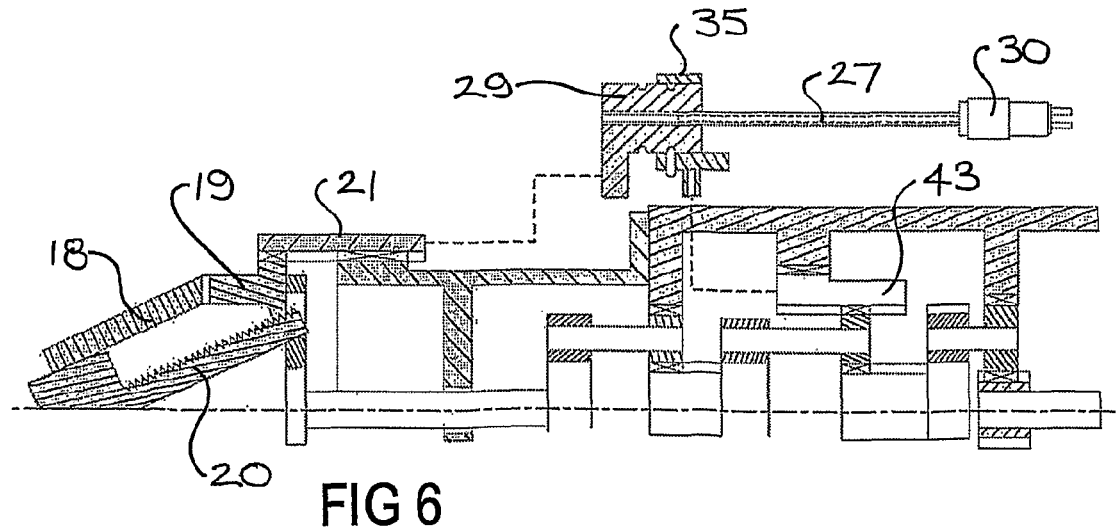
FIG. 6 is a cross section of the power driven selector means, first driven member, and gear assembly in low gear and locking sleeve engaging adjustment nut.

The ring gear 44 is limited in its movement between the low gear position and its high gear position. The connection of the ring gear 43 to the shifter 35 is such that the shifter 35 is movable in position corresponding to relatively low and relatively high gear position. More specifically, once the shifter 35 has moved the ring gear 43 from the high gear position to the low gear position, the shifter 35 cannot be moved further towards the front end of the power tool. Accordingly further operation of the second motor 30 causes the second driven member 29 to move relative to the shifter 35 as shown in FIG. 6. In this position the locking sleeve 21 engages the adjustment nut 19 so that further rotation of the chuck body 18 causes adjustment of the chuck jaws 20.

Where the locking sleeve 21 or ring gear 43 do not mesh correctly, a condition referred to hereinafter as crash condition, the microcontroller 13 will reverse the movement of the second driven member 29. At substantially the same time the microcontroller 13 will pulse the first motor 16 using an air-break switch in the circuit provided the user is depressing the trigger 3 to move the gears of the gear assembly 17 or the adjustment nut 19 so as to allow the ring gear 43 or locking sleeve 21 to mesh correctly. The second motor 30 may operate for 0.5 seconds while the first motor 16 may pulse for 0.1 second. Naturally these durations could vary or be repeated to ensure correct meshing.

When closing the chuck jaws 20 the user depresses the chuck adjust button 8 on the controller 6 which causes the microcontroller 13 to supply power to the second motor 30. This moves the second driven member 29 which in turn moves the locking sleeve 21 to engage the adjustment nut 19. Thereafter the microcontroller 13 supplies current to the first motor 16 to cause rotation of the chuck body 18 thereby adjusting the jaws 20 of the chuck. The microcontroller 13 will monitor the current drawn by the first motor 16 and will cut power to the first motor 16 when that current equals a maximum limit corresponding to the maximum torque required for secure clamping of the working element. After power is cut to the first motor 16, the microcontroller 13 will supply power again to the second motor 30 to cause retraction of the second driven member 29 and locking sleeve 21 and leaving the shifter 35 in a low gear position.

When opening the jaws 20 from a clamp position, the user depresses the chuck adjust button 8 on the controller 6 which causes the locking sleeve 21 to engage the adjustment nut 19 through operation of the power driven selector means 14. Thereafter power is supplied to the first motor 16 by depression of the trigger 3 to cause rotation of the chuck body 18 relative to the adjustment nut 19. This will open the jaws 20 and release the working element. If further opening of the jaws is required, the user must depress the trigger which will cause the microcontroller 13 to supply power again to the first motor 16 to further rotate the chuck body 18. The microcontroller 13 will continue to supply power to the first motor 16 while the user depresses the trigger, or alternatively a maximum open position is reached.

Where the user depresses the chuck adjust button 8 on the controller 6 but does not complete the clamping or unclamping of the working element within 20 seconds, the microcontroller 13 will supply power to the second motor 30 to return the second driven member 29 and locking sleeve 21 to the position disengaged from the adjustment nut.

The power tool 1 can be provided with a Personal Identification Code (PIC) to disable the tool. In order to activate this feature the user depresses the high 9 and chuck adjust buttons 8 on the controller 6 at the same time and holds these buttons for three seconds. The high 9 and chuck adjust buttons 8 will flash three times and thereafter the user enters a four button sequence from the three buttons as a personal identification code. After the user has entered the four button sequence, the microcontroller 13 will confirm the code by flashing each button 8,9,10 in the sequence chosen. If no code is entered, the microcontroller 13 will default to non-active mode. The user may also make this function inactive selecting both the high 9 and chuck adjust buttons 8 and holding those buttons for at least three seconds. The high 9 and chuck adjustment buttons 8 will flash three times. Provided the user leaves the tool idle for at least ten seconds, the microcontroller 13 will default to a non-active mode. When the PIC is set, if the user leaves the tool idle for at least thirty minutes, then presses both the high 9 and chuck adjustment buttons 8 for less than one second, the tool will be locked. In order for the tool to be operated, the user must enter the four button sequence used to set the PIC.

Figure 7:
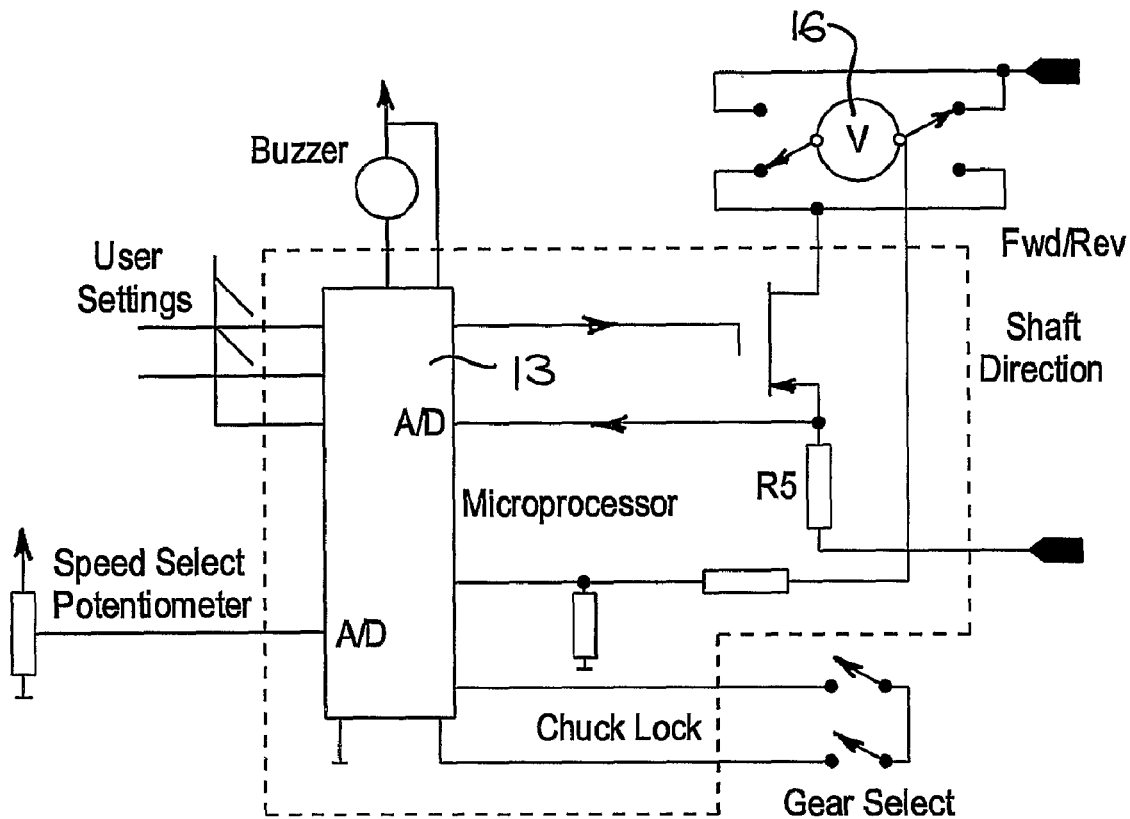
FIG. 7 is a circuit diagram for the power tool.

FIG. 7 illustrates a circuit diagram for the power tool. It should be noted that power to the motor 16 is supplied via the resistor RS. The voltage across resistor RS provides a measure of the current flowing through it and the motor 16. The voltage providing a measure of the current is supplied to the microcontroller 13 and is averaged by either software or hardware. The measured current represents the torque produced by motor 16 and is compared against the operator selected torque value. When the measured current represents a torque that is equal to or exceeds the operator selected value, action is taken to signal the operator, change gears, or cut power supply to the electric motor 16.

Figure 8:
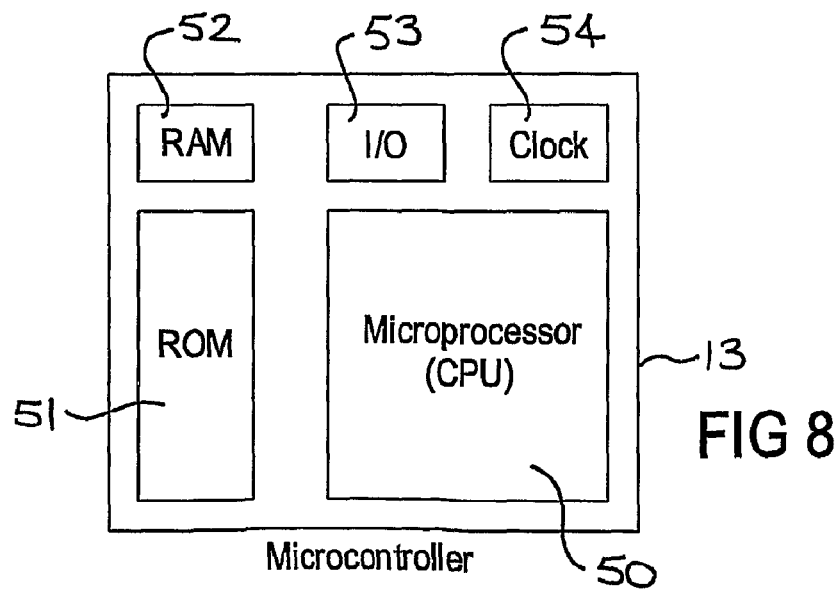
FIG. 8 is a schematic diagram of a microcontroller forming part of the circuit diagram shown in FIG. 7.

FIG. 8 is a schematic diagram of the microcontroller 13 forming part of the circuit diagram shown in FIG. 7. The microcontroller 13 includes central processing unit (CPU) 50, a non-volatile memory device 51 for storing control logic to cause the microcontroller to execute the functionality described herein, a volatile memory device 52 for temporarily storing data and control signals input to and output from the CPU 50, an input/output (I/O) control unit 53 and a clock unit 54.

In another embodiment, the invention may be implemented primarily in hardware using, for example, hardware components such as application specific integrated circuits (ASICs). Implementation of the necessary hardware components to perform the functionality described herein will be apparent to persons skilled in the relevant art(s).

In yet another embodiment, the invention may be implemented using a combination of both hardware and software.

A power tool as hereinbefore described has particular advantages assisting the user to grip or release a working element. The use of a microcontroller, preferably incorporated with a PCB, to control at least this function is also a useful advantage. Controlling the level of torque produced by the power tool in the adjustment mode of operation, enables the power tool to grip the working element whilst reducing the likelihood of destroying the working element. Furthermore the ability to control the level of torque produced by the power tool during the working mode of operation reduces the likelihood of damaging the workpiece. The use of the microcontroller to control other functions such as selection of relatively high and relatively low gear, facilitating correct meshing of gears and safety lockout are further advantageous features.

Finally it is to be understood that various other modifications and/or alterations may be made without departing from the spirit of the present invention as outlined herein.

The claims defining the invention are as follows:

1. A power tool including a first driven member for gripping a working element, the power tool being operable in either a working mode in which the first driven member is driven to enable a gripped working element to perform work, or an adjustment mode in which the first driven member alternatively grips or releases the working element, and a powered selector operable to cause the power tool to alternatively operate in one of said modes.

2. A power tool according to claim 1, wherein the first driven member includes a body part and an adjustment part that when in the adjustment mode are moved relative to one another, to alternatively grip or release the working element, and said parts move together when in the working mode, the power tool also including a primary drive means which is connected to the body part to drive the first driven member, the primary drive means including a first motor and a gear assembly through which the first motor is connected to the first driven member so that when in the working mode the gear assembly is adjustable between a relatively low gear and a relatively high gear.

3. A power tool according to claim 2, wherein the gear assembly is operable in more than two gears.

4. A power tool according to claim 2, wherein the powered selector adjusts the gear of the gear assembly.

5. A power tool according to claim 2, including a locking means operable to engage the adjustment part and thereby enable the body part to move relative to the adjustment part when the primary drive means drives the body part, whereby the selector is operable to cause the locking means to engage with or disengage from the adjustment part.

6. A power tool according to claim 2, wherein the powered selector includes a secondary drive that is operable to move a second driven member whereby the locking means is connected to the second driven member to move therewith.

7. A power tool according to claim 6, wherein the secondary drive includes a second motor driving a screw threaded output shaft, which is received by a threaded bore located in the second driven member.

8. A power tool according to claim 6, wherein the microcontroller is connected to a sensor which assesses the position of the second driven member so that the microcontroller can identify whether the power tool is operating in the adjustment mode, or any one of the gears of the gear assembly.

9. A power tool according to claim 2, wherein the powered selector includes a shifter that is connected to the gear assembly for movement between a relatively low gear position and a relatively high gear position whereby the selector includes biasing for biasing the shifter towards a low gear position.

10. A power tool according to claim 1, wherein the powered selector preferably includes a microcontroller adapted to receive user input from a controller that includes at least one switch, to enable the user to select the adjustment mode or the working mode.

11. A power tool according to claim 2, wherein the controller also includes a switch to enable selection of any one of the gears of the gear assembly when in the working mode.

12. A power tool according to claim 2, wherein the powered selector preferably includes a microcontroller adapted to receive user input from a controller that includes at least one switch, to enable the user to select the adjustment mode or the working mode and wherein the microcontroller also controls the level of current supplied to the primary drive means to control the level of torque supplied to the first driven member, whereby the controller includes a dial that receives user input on the level of torque selected by the user.

13. A power tool according to claim 2, including a direction switch for controlling the direction of current supplied to the primary drive means to control a direction of output from the primary drive means.

14. A power tool according to claim 2, including a primary drive switch for controlling the supply of power to the primary drive means, the primary drive switch is preferably operable by a trigger button that can be depressed by a user to supply power to the primary drive when operating in either the adjustment mode or the working mode.

15. A power tool according to claim 1, wherein the power tool is a hand held power tool having its own power source in the form of a rechargeable battery.

16. A power tool according to claim 1, wherein the power tool is a power drill.

17. A microprocessor for use with a power tool according to claim 2, the microprocessor including a processing unit and associated memory device for storing control logic to cause the microprocessor to:
   receive a first user input from a controller representative of user selection of the adjustment mode or the working mode; and
   control the powered selector to cause the power tool to operate in the selected mode.

18. A microprocessor according to claim 17, wherein the control logic further acts to cause the microprocessor to:

receive a second user input from the controller representative of user selection of relatively low or relatively high gear when in the working mode; and control the powered selector to cause the power tool to operate in the selected gear.

19. A microprocessor according to claim 18, wherein the control logic further acts to cause the microprocessor to:

receive a sensor input from a sensor which assesses the position of a second driven member; and identify whether the power tool is operating in the adjustment mode, or relatively low or relatively high gear.

20. A microprocessor according to claim 19, wherein the control logic further acts to cause the microprocessor to:

receive a third user input from the controller representative of user selection of a desired level of torque for supply to the first driven member; and control the level of current supplied to the primary drive to set the level of torque supplied to the first driven member to the selected level.

21. A power tool for use with a working element, the power tool including:

a power source;

a first driven member for gripping the working element;

a primary drive including a first motor and a gear assembly through which the first motor is connected to the first driven member, the gear assembly being adjustable to operate in a relatively high or relatively low gear;

a shifter connected to the gear assembly and being operable to adjust the gear assembly between the relatively high or relatively low gear, the shifter having a second motor connected by an output shaft to a second driven member wherein the second driven member is connected to the gear assembly;

a microcontroller connected to the second motor for controlling power supplied from the power source to the second motor; and a controller for providing user inputs to the microcontroller, including a relatively high gear switch and a relatively low gear switch through which the user selects the gear assembly to operate in the relatively high or relatively low gear via operation of the shifter.

22. A power tool for use with a working element including:

a primary drive;

a first driven member driven by the primary drive;

a microcontroller controlling the level of current supplied to the primary drive means to control the level of torque supplied to the first driven member;

the power tool being operable in either a working mode in which the first driven member is driven to enable a gripped working element to perform work, or an adjustment mode in which the first driven member alternatively grips or releases the working element; and a powered selector operable to switch the power tool to operate in either the working mode or the adjustment mode.

23. A microprocessor for use with a power tool for use with a working element, the power tool including:

a power source;

a first driven member for gripping the working element;

a primary drive including a first motor and a gear assembly through which the motor is connected to the first driven member, the gear assembly being adjustable to operate in relatively high or relatively low gear;

a shifter connected to the gear assembly and being operable to adjust the gear assembly between the relatively high or relatively low gear, the shifter having a second motor connected by an output shaft to a second driven member wherein the second driven member is connected to the gear assembly; and a controller including user input devices, the user input devices including a relatively high gear switch and a relatively low gear switch through which the user selects the gear assembly to operate in the relatively high or relatively low gear via operation of the shifter, the microprocessor including a processing unit and associated memory device for storing control logic to cause the microprocessor to: receive user inputs from the user input devices; and control power supplied from a power source to the second motor according to the received user inputs.

24. A microprocessor for use with a power tool for use with a working element, the power tool including:

a primary drive;

a first driven member for driven by the primary drive, the power tool being operable in either a working mode in which the first driven member is driven to enable a gripped working element to perform work or an adjustment mode in which the first driven member alternatively grips or releases the working element; and a powered selector operable to switch the power tool to operate in either the working mode or the adjustment mode, the microprocessor including a processing unit and associated memory device for storing control logic to cause the microprocessor to:

receive a first user input from a controller representative of user selection of the adjustment mode or the working mode; and control the powered selector to cause the power tool to operate in the selected mode.

* * * * *